No. 795,575. PATENTED JULY 25, 1905.
L. BARNES.
BAGGAGE AND FREIGHT TRUCK.
APPLICATION FILED JUNE 30, 1904.
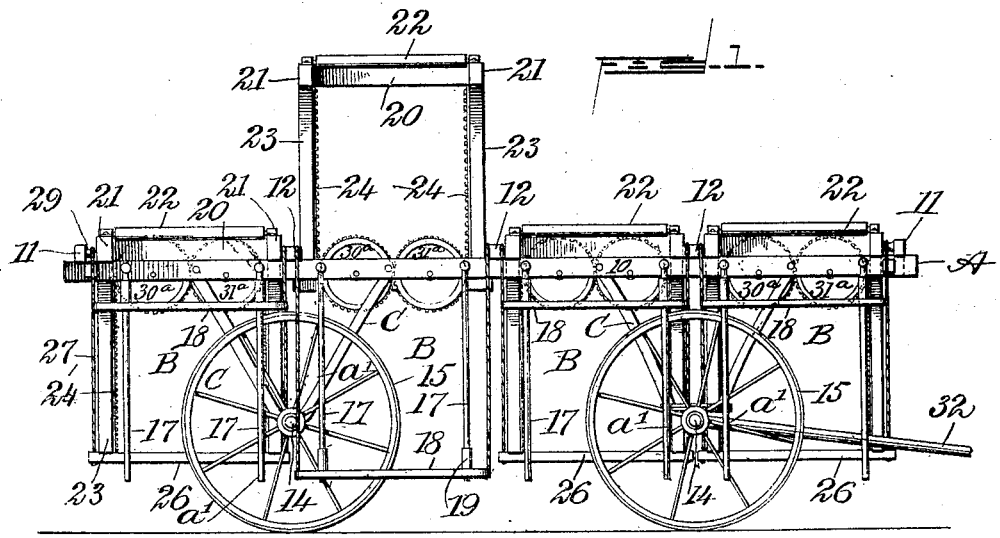
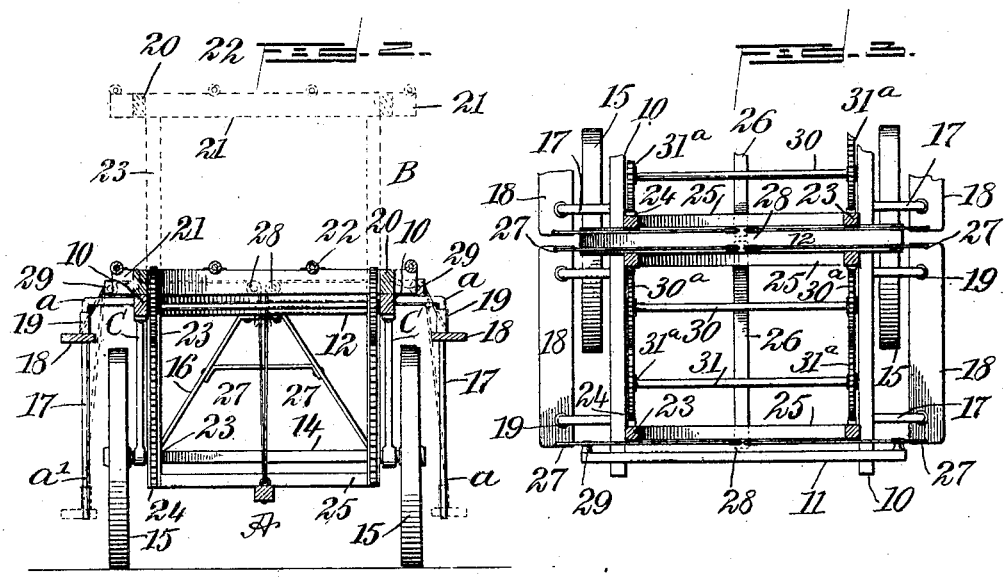
WITNESSES:
INVENTOR
Lewis Barnes
BY
ATTORNEYS

UNITED STATES PATENT OFFICE.

LEWIS BARNES, OF OXFORD, MICHIGAN.

BAGGAGE AND FREIGHT TRUCK.

No. 795,575.  Specification of Letters Patent.  Patented July 25, 1905.

Application filed June 30, 1904. Serial No. 214,758.

*To all whom it may concern:*

Be it known that I, LEWIS BARNES, a citizen of the United States, and a resident of Oxford, in the county of Oakland and State of Michigan, have invented a new and Improved Baggage and Freight Truck, of which the following is a full, clear, and exact description.

The purpose of my invention is to provide a truck especially adapted for conveying baggage to a baggage-car or to receive baggage therefrom and which may also be used for freight and to provide the truck with one or more (usually four) elevating-sections, upon which the baggage is placed, the said sections being so arranged that they may be quickly, conveniently, and independently elevated to bring the upper portions of the said sections either flush with or above the floor of the car, enabling the baggage to be removed from the truck to the car or from the car to the truck with a minimum of exertion and without damage to the articles.

Another purpose of the invention is to construct the elevating-sections of the truck in such manner that they may be raised by the weight of the operator brought to bear upon steps connected with the said elevating-sections, the sections returning to their lower or normal position automatically when such weight is removed.

It is also a purpose of the invention to provide means by which when a section is elevated each corner of the section will rise equally, thus preventing any undue lateral strain or binding.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of the improved truck. Fig. 2 is a vertical section through the main frame and one of the elevating-sections, and Fig. 3 is a sectional plan view of a portion of the truck.

The device consists, primarily, of a wheel-supported main frame A and one or more elevating-frames B, which operate in the main frame. In the drawings four elevating-frames are illustrated; but it will be understood that a greater or lesser number may be employed.

The main frame A consists of opposing side beams 10 and end beams 11, which extend between the side beams and above them, as is shown in Fig. 1, together with transverse beams 12, corresponding to the end beams 11, and so located with respect to the side beams 10 as to form separating-beams for the various elevating-sections B employed. Pedestals or hangers C extend downward from the side beams 10 between their centers and their ends. Corresponding pedestals or hangers C receive axles 14, and on these axles supporting-wheels 15 are mounted to turn, and the said axles 14 are held against lateral movement preferably by means of A beams or braces 16, secured to the axles and to the cross or separating beams 12 above the axles, as is shown in Fig. 2. In the further construction of the main frame A guide-bars 17 are located in pairs at each side of the main frame, where an elevating-frame B is mounted for action. These guide-bars 17 extend from the side beams 10 of the main frame A in an upper horizontal member $a$ and a downwardly-extending and vertical member $a'$, and corresponding guide-bars 17 at each side of the main frame A are in transverse alinement. These guide-bars 17 are adapted to receive and guide steps 18, a step being provided for each pair of guide-bars, and the guide-bars pass through the said steps and through sleeves 19, connected with the said steps, as is shown in Figs. 1 and 2. The said steps 18 are adapted to be normally at the upper portions of their guide-bars 17; but when the elevating-sections above referred to have been carried upward these steps are carried downward to the dotted position shown in Fig. 2 and as is shown in positive lines in Fig. 1, the steps being carried to such downward position by reason of the operator placing his weight on one or the other of the steps belonging to an elevating-section.

With reference to the elevating-frames B, they are all of the same construction and are located and have play in the main frame A between the upper intermediate cross or dividing bars 12, as is clearly shown in Fig. 1. Each elevating-frame consists of an upper section which comprises opposing side bars 20 and opposite end bars 21, which end bars extend beyond the end portions of the side bars more or less and are adapted to rest upon the upper edges of the side beams 10 of the main frame. In the further construction of the upper portion of an elevating-frame B rollers 22 are mounted to turn in suitable bearings located on the upper faces of the end bars 21, and corner bars 23 extend down from the upper section of the frame, being connected at their lower ends by lower cross-bars 25, and on the inner face of each corner-bar 23 a rack 24 is formed, extending practically the length of the said corner-bars, which racks are adapted for a purpose to be hereinafter described. Furthermore, in the construction of each elevating-frame B a longitudinal bottom bar 26 is provided, which is at the central lower portion of the elevating-frame and is attached to the cross-bars 25, extending a greater or a lesser distance beyond the same.

Cords, ropes, or cables 27 are attached to the end portions of the steps 18 of an elevating-section, and these cords, ropes, or cables are carried upward over friction-rollers 29, located at the end portions of the cross-bars 12 and end bars 11 of the main frame A. The said ropes, chains, or cables 27 after passing over the friction-rollers 29 are carried inward over the cross-bar 12 or end bar 11, as the case may be, and over friction-rollers 28, located at the central portion of such bar, as is shown in Figs. 2 and 3, and thence downward to an engagement with the outer end portions of the longitudinal bars 26 at the bottom of the elevating-section.

This construction permits the weight of the elevating-frame to normally carry the said frame downward, so that its upper portion will rest on the main frame, and the steps connected with the cords, chains, or cables 27 are at such time brought to an upper position, and as these cords, ropes, or cables are attached to the end portions of the steps belonging to an elevating-section and to the lower central portions of said sections at their ends when a step is pressed downward the elevating-section B will be raised without lateral movement or straining and will carry upward all the weight which may be placed on its roller-top, and when pressure on a step is removed the elevating-section previously operated will drop to its lower or normal position. However, in order that the movement of an elevating-frame B in rising or in lowering may be equal and uniform at each corner, so as not to rack the structure, each elevating-frame B is provided at its upper portion with transverse shafts 30 and 31, and these shafts carry, respectively, at their outer ends gears $30^a$ and $31^a$, the gears at each side of an elevating-section being arranged to mesh with each other and likewise to engage with the teeth of the racks 24, carried by the corner-bars of the elevating-frame. This gear-and-rack connection enables an elevating-section to be raised even if it sustains a great weight with comparatively little effort on the part of the operator, and when an elevating-section descends the descent will be uniform and slow. Under this construction it is evident that when a truck is loaded with baggage it can be drawn to the door of a car in the usual way and one section after the other elevated to a level with the floor of the car or a point above the floor, enabling the articles handled to be quickly and conveniently removed from the truck without much exertion on the part of the attendant and with comparatively little damage to the articles and that the articles may be received from a car with equally good results as when delivered to such car.

The truck is provided with a suitable tongue 32, which is connected in any suitable manner, usually with what may be termed the "forward axle" of the truck.

Having thus described my invention, I claim as new and desire to secure by Letters Patent—

1. In a truck a body, a sustaining-frame mounted for up-and-down movement in the body, a sliding support mounted in the body and adapted to receive the operator, and an operative connection between said member and the sustaining-frame.

2. A truck, comprising a wheel-supported frame, a sustaining-frame mounted for up-and-down movement in the wheel-supported frame, a vertically-sliding support mounted on the wheel-supported frame and adapted to receive the operator, and a connection between the said member and the sustaining-frame.

3. A truck, comprising a wheel-supported frame, a plurality of sustaining-frames mounted for up-and-down movement in the wheel-supported frame, weight-receiving members having sliding and guided movement on the wheel-supported frame, and an operative connection between each of said members and a sustaining-frame.

4. A truck comprising a wheel-supported main frame, a baggage carrying and elevating frame mounted for vertical movement in the main frame, the baggage carrying and elevating frame comprising an upper structure located above the main frame, downwardly-extending corner-posts, racks secured to the said corner-posts, connections between transversely-opposing corner-posts and a longitudinal connecting-bar between the said transverse connecting-bars, guide-rods extending downward from the sides of the main frame, steps having sliding movement on the guide-rods, chains or cables attached to the end portions of the steps, friction-rollers on the main frame over which said chains or cables are passed, said chains or cables being also passed downward through the main frame to a connection with the end portions of the longitudinal connecting-bar, and coöperating gears carried by the main frame and arranged for engagement with the racks of the baggage carrying and elevating frame.

5. In a baggage-truck, a wheel-supported body, shafts carried thereby, gears secured to said shafts at their end portions, corresponding gears being in mesh, guide-pulleys carried by the upper portion of said main frame, a baggage supporting and elevating frame mounted for vertical movement in the main frame, racks secured on said baggage supporting and elevating frame, which racks are adapted for engagement with said gears, guides extending downward from the side portions of the main frame, steps having sliding movement on the guides, and chains or cables attached to the end portions of the steps, being passed over the guide-pulleys of the main frame and down to a connection with the lower end portions of the baggage carrying and elevating frame.

6. In a truck, a wheel-supported frame, steps having guided movement on the frame, a sustaining-frame, and a connection between the steps and sustaining-frame, whereby when the weight of the operator is placed upon the steps the frame will be raised.

7. In a truck, a wheel-supported frame, steps having sliding and guided movement on the frame, a sustaining-frame mounted for up-and-down movement, a connection between the step and frame for operating the latter from the former, and means for causing an equal and uniform rising and lowering of said frame.

8. In a truck, a wheel-supported frame, racks carried by the frame, steps having guided movement on said frame, a sustaining-frame mounted for up-and-down movement, cords attached to the sustaining-frame and steps and passing over guide-rollers, and pinions carried by the sustaining-frame and engaging the said racks.

In testimony whereof I have signed my name to this specification in the presence of two subscribing witnesses.

LEWIS BARNES.

Witnesses:
J. A. MURRAY,
G. R. HUNTLEY.